(12) United States Patent  
Spare et al.

(10) Patent No.: US 8,168,319 B2
(45) Date of Patent: May 1, 2012

(54) PORTABLE COMPUTER BATTERY STRUCTURES

(75) Inventors: Bradley L. Spare, Oceanside, CA (US); Michael D. Hillman, Los Altos, CA (US); Robert L. Coish, Mountain View, CA (US); Chris Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 694 days.

(21) Appl. No.: 12/340,618

(22) Filed: Dec. 19, 2008

(65) Prior Publication Data

US 2010/0092845 A1    Apr. 15, 2010

Related U.S. Application Data

(60) Provisional application No. 61/105,039, filed on Oct. 13, 2008.

(51) Int. Cl.
*H01M 2/10* (2006.01)
*H01M 2/20* (2006.01)
*H01M 2/02* (2006.01)
*H01M 10/48* (2006.01)

(52) U.S. Cl. .......... 429/159; 49/7; 49/90; 49/99; 49/121
(58) Field of Classification Search .......... None
See application file for complete search history.

(56) References Cited

U.S. PATENT DOCUMENTS

| | | | |
|---|---|---|---|
| 3,568,139 A | 3/1971 | Delzer | |
| 4,224,383 A | 9/1980 | Taylor | |
| 4,270,827 A | 6/1981 | Potgieter | |
| 4,473,264 A | 9/1984 | Julian et al. | |
| 4,920,018 A | 4/1990 | Turner | |
| 4,991,058 A | 2/1991 | Watkins et al. | |
| 5,155,662 A | 10/1992 | I-Shou | |
| 5,169,338 A | 12/1992 | Dewar et al. | |
| 5,187,643 A | 2/1993 | I-Shou | |
| 5,323,291 A | 6/1994 | Boyle et al. | |
| 5,325,984 A | 7/1994 | Ady et al. | |
| 5,346,407 A | 9/1994 | Hood | |
| 5,489,486 A * | 2/1996 | Glover | 429/100 |
| 5,566,048 A | 10/1996 | Esterberg et al. | |
| 5,572,402 A | 11/1996 | Jeong | |
| 5,670,267 A | 9/1997 | Lee | |
| 5,808,864 A | 9/1998 | Jung | |
| 5,895,440 A | 4/1999 | Proctor et al. | |

(Continued)

FOREIGN PATENT DOCUMENTS

WO    WO 01/99210    * 12/2001

*Primary Examiner* — Jonathan Crepeau
(74) *Attorney, Agent, or Firm* — Treyz Law Group; David C. Kellogg; G. Victor Treyz

(57) ABSTRACT

Portable computer battery structures are provided. The portable computer battery structures may include a battery with a metal enclosure and a battery cable with a floating end. The battery may have six cells. Three pairs of parallel-connected cells may be connected together in series. The six cells may be substantially planar in shape. The battery may have a connector with at least five conductive pins and six recesses. The battery cable may have a cable with at least five conductive pins that mate with the five pins of the battery's connector and with six support pins that slide into the six recesses of the battery's connector. The batter connector may be formed on a printed circuit board substrate that folds over on itself.

17 Claims, 11 Drawing Sheets

U.S. PATENT DOCUMENTS

| | | |
|---|---|---|
| RE36,381 E | 11/1999 | Boyle et al. |
| 6,068,520 A | 5/2000 | Winings et al. |
| 6,249,426 B1 | 6/2001 | O'Neal et al. |
| 6,297,946 B2 | 10/2001 | O'Neal et al. |
| 6,304,060 B1 | 10/2001 | Dernehl |
| 6,304,433 B2 | 10/2001 | O'Neal et al. |
| 6,413,120 B1 | 7/2002 | Winings |
| 6,477,035 B1 | 11/2002 | Cepas et al. |
| 6,483,719 B1 | 11/2002 | Bachman |
| 6,501,644 B1 | 12/2002 | Silverman et al. |
| 6,660,427 B1 | 12/2003 | Hukill et al. |
| 6,696,197 B2 * | 2/2004 | Inagaki et al. ............ 429/120 |
| 6,751,484 B1 | 6/2004 | Sandelius et al. |
| 6,781,827 B2 | 8/2004 | Goodman et al. |
| 6,879,259 B1 | 4/2005 | Smith et al. |
| 6,887,616 B2 | 5/2005 | Kim et al. |
| 7,013,558 B2 | 3/2006 | Bachman |
| 2004/0119442 A1 * | 6/2004 | Lee et al. ............ 320/112 |
| 2006/0012969 A1 | 1/2006 | Bachman |
| 2006/0019155 A1 * | 1/2006 | Seman et al. ............ 429/159 |
| 2006/0141344 A1 | 6/2006 | Chen et al. |
| 2006/0172183 A1 | 8/2006 | Chen et al. |
| 2007/0031727 A1 | 2/2007 | Hsu |
| 2007/0111086 A1 | 5/2007 | Li et al. |
| 2007/0117598 A1 | 5/2007 | Yang et al. |
| 2007/0151751 A1 | 7/2007 | Robbins et al. |
| 2008/0013268 A1 | 1/2008 | Wong et al. |

* cited by examiner

PORTABLE COMPUTER BATTERY STRUCTURES

This application claims the benefit of provisional patent application No. 61/105,039, filed Oct. 13, 2008, which is hereby incorporated by reference herein in its entirety.

BACKGROUND

This invention relates to electronic devices and, more particularly, to battery structures for electronic devices such as portable computers.

Designers of portable computers are faced with competing demands. For example, it is generally desirable to reduce the weight and size of a portable computer, so that a user is not burdened by an overly heavy or overly large device. At the same time, performance characteristics such as battery life should not suffer. Often, the size of components such as a battery can be reduced, but only at the expense of reducing battery capacity and therefore battery life. For example, conventional batteries may include relatively bulky battery management circuits and relatively bulking battery enclosures or casings.

It would therefore be desirable to be able to provide improved batteries, battery subsystems, and battery enclosures for electronic devices such as portable computers.

SUMMARY

Portable computers with improved battery subsystems are provided. A battery may include battery cells mounted within a battery enclosure. The battery enclosure may be formed from metal. For example, the battery enclosure may be formed from a layer of sheet metal. A hem along one edge of the battery enclosure may be formed using a folded portion of the sheet metal and an adhesive. A metal end wall may be provided that occupies a small volume. A stacked mounting structure may be used to house an integral battery management unit. A window in the battery enclosure may be used to allow battery contacts to mate with a floating battery cable in a portable computer.

The battery may have six substantially planar cells that are connected together through a combination of series and parallel electrically connections. For example, three sets of cells may be formed by connecting together two cells in parallel for each set. The three sets of parallel-connected cells may then be connected in a series combination. With this type of arrangement, the battery may produce a ground voltage, a voltage equal to the voltage of a single cell, a voltage equal to the voltage of two cells in series, and a voltage equal to the voltage of three cells in series while each of these voltages is provided by two parallel-connected cells.

The battery may have a connector with at least five conductors. The five conductors may carry the ground voltage and three voltages created by the parallel-series connected battery cells as well as data signals that convey information about the battery such as the battery's charge state and temperature to an electronic device.

Further features of the invention, its nature and various advantages will be more apparent from the accompanying drawings and the following detailed description of the preferred embodiments.

DETAILED DESCRIPTION

The present invention related to batteries and battery subsystems for portable computer. The battery may include battery cells mounted within a battery enclosure formed from metal. A stacked mounting structure may be used to house an integral battery management unit. The stacked mounting structure may be formed from a rigid flex circuit board structure that is folded back upon itself. A window in the battery enclosure may be used to allow battery contacts to mate with a floating battery cable in the portable computer.

Figure 1:
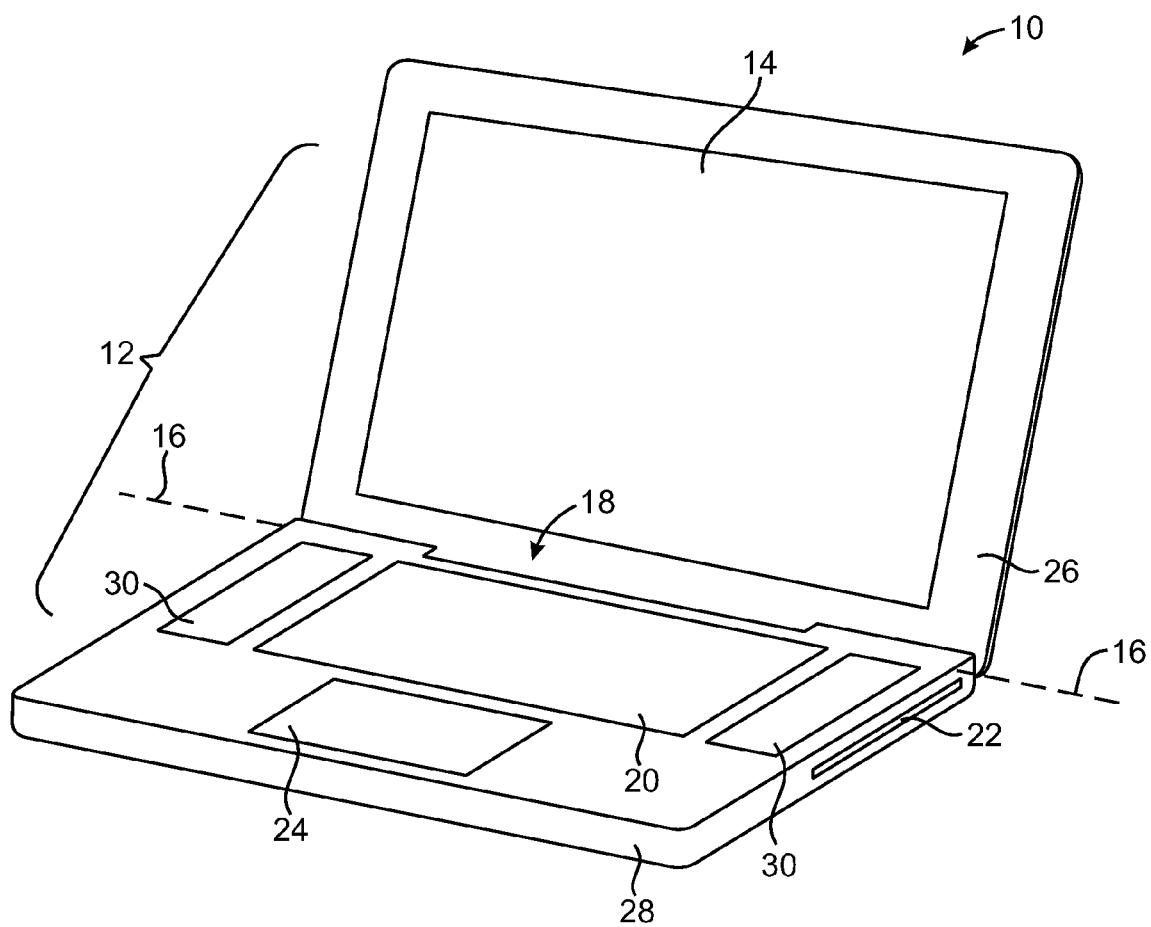
FIG. 1 is a perspective view of an illustrative portable computer in accordance with an embodiment of the present invention.

An illustrative electronic device such as a portable computer in which a battery may be used is shown in FIG. 1. Portable computer 10 may be a laptop computer, as an example. As shown in FIG. 1, portable computer 10 may have a housing 12. Housing 12, which is sometimes referred to as a case, may be formed from one or more individual structures. For example, housing 12 may have a main structural support member that is formed from a solid block of machined aluminum or other suitable metal. One or more additional structures may be connected to the housing 12. These structures may include, for example, internal frame members, external coverings such as sheets of metal, etc. Housing 12 and its associated components may, in general, be formed from any suitable materials such as such as plastic, ceramics, metal, glass, etc. An advantage of forming housing 12 at least partly from metal is that metal is durable and attractive in appearance. Metals such as aluminum may be anodized to form an insulating oxide coating.

Case 12 may have an upper portion 26 and a lower portion 28. Lower portion 28 may be referred to as the base or main unit of computer 10 and may contain components such as a hard disk drive, battery, and main logic board. Upper portion 26, which is sometimes referred to as a cover or lid, may rotate relative to lower portion 28 about rotational axis 16. Portion 18 of computer 10 may contain a hinge and associated clutch structures and is sometimes referred to as a clutch barrel.

Lower housing portion 28 may have a slot such as slot 22 through which optical disks may be loaded into an optical disk drive. Lower housing portion may also have a touchpad such as touchpad 24 and may have keys 20. If desired, additional components may be mounted to upper and lower housing portions 26 and 28. For example, upper and lower housing portions 26 and 28 may have ports to which cables can be connected (e.g., universal serial bus ports, an Ethernet port, a Firewire port, audio jacks, card slots, etc.). Buttons and other controls may also be mounted to housing 12.

If desired, upper and lower housing portions 26 and 28 may have transparent windows through which light may be emitted (e.g., from light-emitting diodes). This type of arrangement may be used, for example, to display status information to a user. Openings may also be formed in the surface of upper and lower housing portions to allow sound to pass through the walls of housing 12. For example, openings may be formed for microphone and speaker ports. With one illustrative arrangement, speaker openings such as speaker openings 30 may be formed in lower housing portion 28 by creating an array of small openings (perforations) in the surface of housing 12.

A display such as display 14 may be mounted within upper housing portion 26. Display 14 may be, for example, a liquid crystal display (LCD), organic light emitting diode (OLED) display, or plasma display (as examples). A glass panel may be mounted in front of display 14. The glass panel may help add structural integrity to computer 10. For example, the glass panel may make upper housing portion 26 more rigid and may protect display 14 from damage due to contact with keys or other structures.

Computer 10 may have input-output components such as touch pad 24. Touch pad 24 may include a touch sensitive surface that allows a user of computer 10 to control computer 10 using touch-based commands (gestures). A portion of touchpad 24 may be depressed by the user when the user desires to "click" on a displayed item on screen 14.

Figure 2:
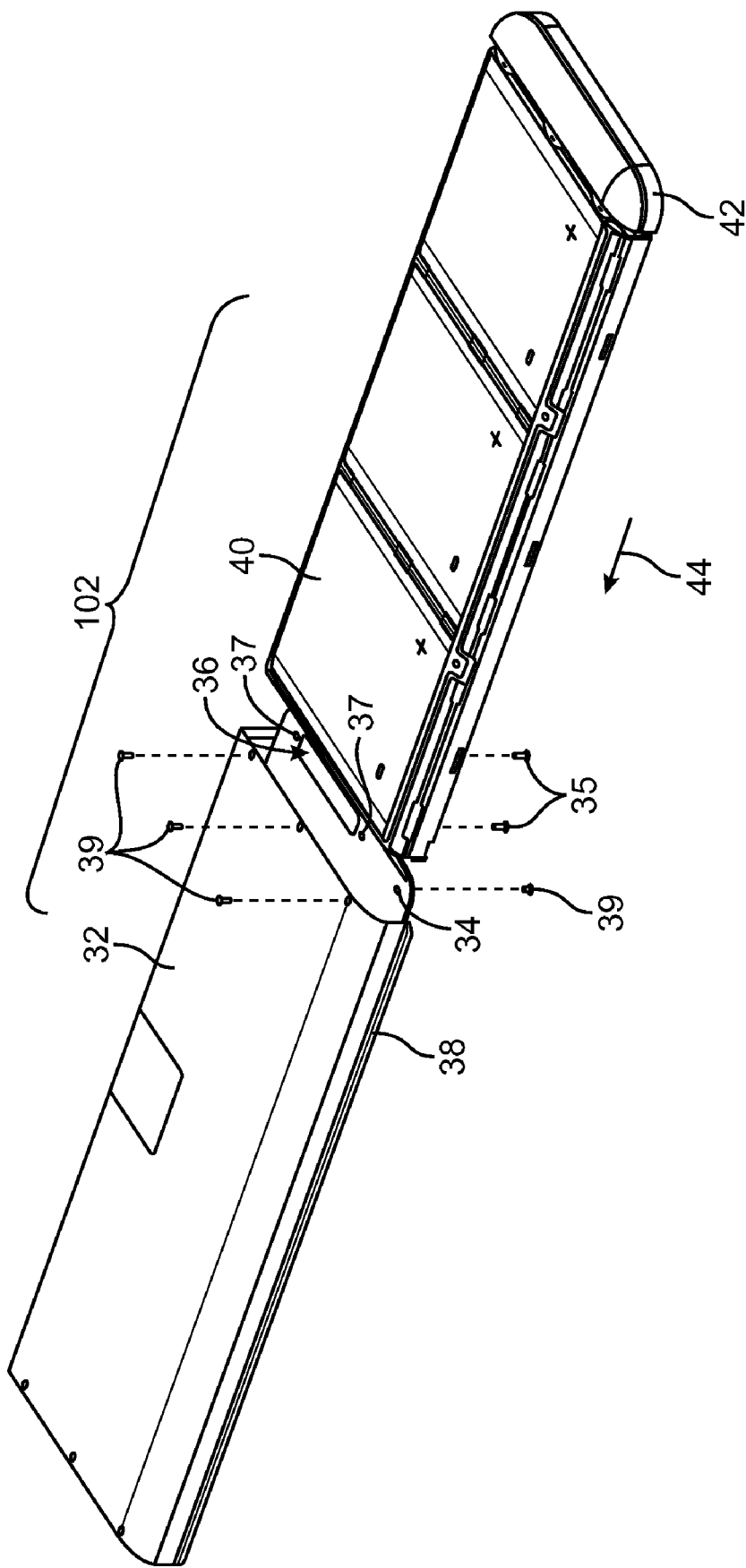
FIG. 2 is a perspective view of an illustrative battery showing an interior battery assembly and a battery sleeve in accordance with an embodiment of the present invention.

A perspective exploded view of an illustrative battery that may be used in computer 10 is shown in FIG. 2. As shown in FIG. 2, battery 102 may include interior portion 40 and sleeve 32. Interior portion 40 may include any suitable battery cells such as lithium-ion cells. Portion 40 may be inserted into sleeve 32 by sliding portion 40 in direction 44. When inserted, plastic end cap 42 forms an end of the battery enclosure for battery 102.

Battery sleeve 32 may be formed from a thin sheet of metal that has been folded to form an enclosure. The edge of the metal sheet may be sealed along hem 38 by folding the sheet back upon itself. Adhesive may also be included within the gaps along hem 38 to further seal the battery interior from its exterior. Planar shell portion 34 may have an opening 36 through which battery contacts on the lower portion of endcap 42 may be contacted. When inserted into computer 10, these contacts may make contact with a mating male end of a battery cable.

When battery 102 is inserted into computer 10, opening 36 may allow a male connector to protrude into endcap 42 and mate with a corresponding connector inside endcap 42. For example, a connector such as connector 108 of FIG. 6 may pass through opening 36 in sleeve 32 and couple to a connector such as connector 74 of FIG. 4. If desired, connector 74 may be secured to sleeve 32 and opening 36 by screws 35. Screws 35 may pass through openings 37 in sleeve 32. With one suitable arrangement, screws 35 may be longer than screws 39, which may be used to secure endcap 42 to sleeve 32, and screws 96 of FIG. 3, which may be used to secure end wall 94 to sleeve 32. This type of arrangement may ensure that screws 35 are long enough to secure connector 74 to sleeve 32.

Figure 3:
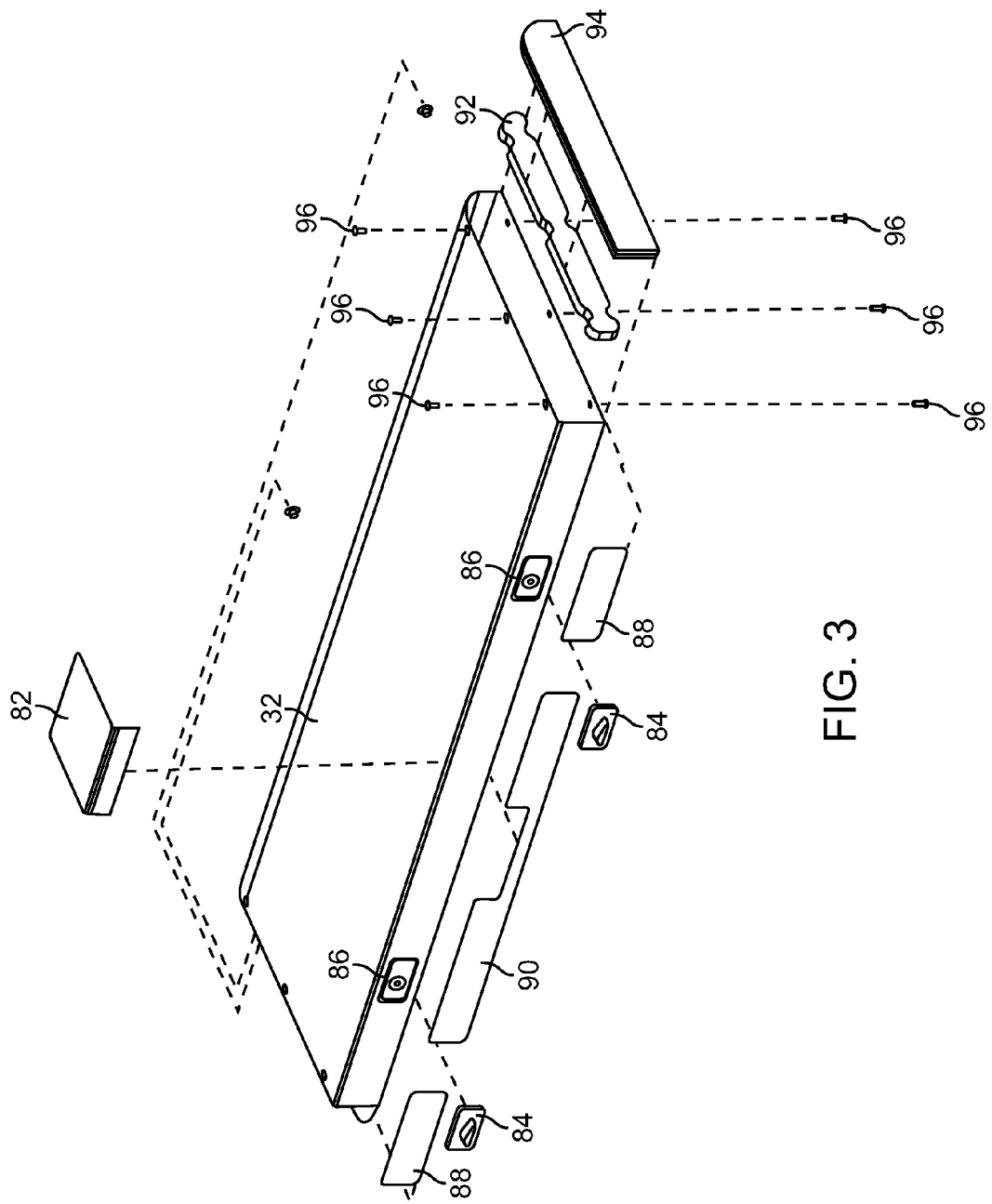
FIG. 3 is an exploded perspective view of an illustrative battery enclosure showing interior shims and spacers that may be used and showing how an end wall may be connected to one end of the enclosure in accordance with an embodiment of the present invention.

FIG. 3 shows how end wall 94 may be screwed into sleeve 32 using screws 96. Sleeve 32 may be formed from a metal such as aluminum. End wall 94 may also be formed from metal. The use of metal for enclosing battery 102 allows the structures of the battery enclosure to be compact. End wall 94 may be attached to sleeve 32 at the end of sleeve 32 opposite to that at which end cap 42 is connected.

Foam 92 may be mounted to the inside surface of end wall 94 to help provide shock resistance for battery 102. Plastic tab 82 may be connected to the outer surface of sleeve 32 to help a user remove battery 102 from the interior of computer 10.

Cleats 84 may be attached to the exterior of sleeve 32 in regions 86 (e.g., using adhesive). In regions 86, the sheet metal of sleeve 32 protrudes slightly inwardly so that cleats 84 may lie flush with the surrounding portions of sleeve 32. Smooth interior walls in sleeve 32 may facilitate insertion of interior portion 40 of battery 102 into sleeve 32. To help ensure that the interior of sleeve 32 is smooth, even in the presence of inward protrusions under regions 86, spacer structures such as spacer 90 and shims 88 may be mounted in the interior of sleeve 32 adjacent to protruding portions 86.

Figure 4:
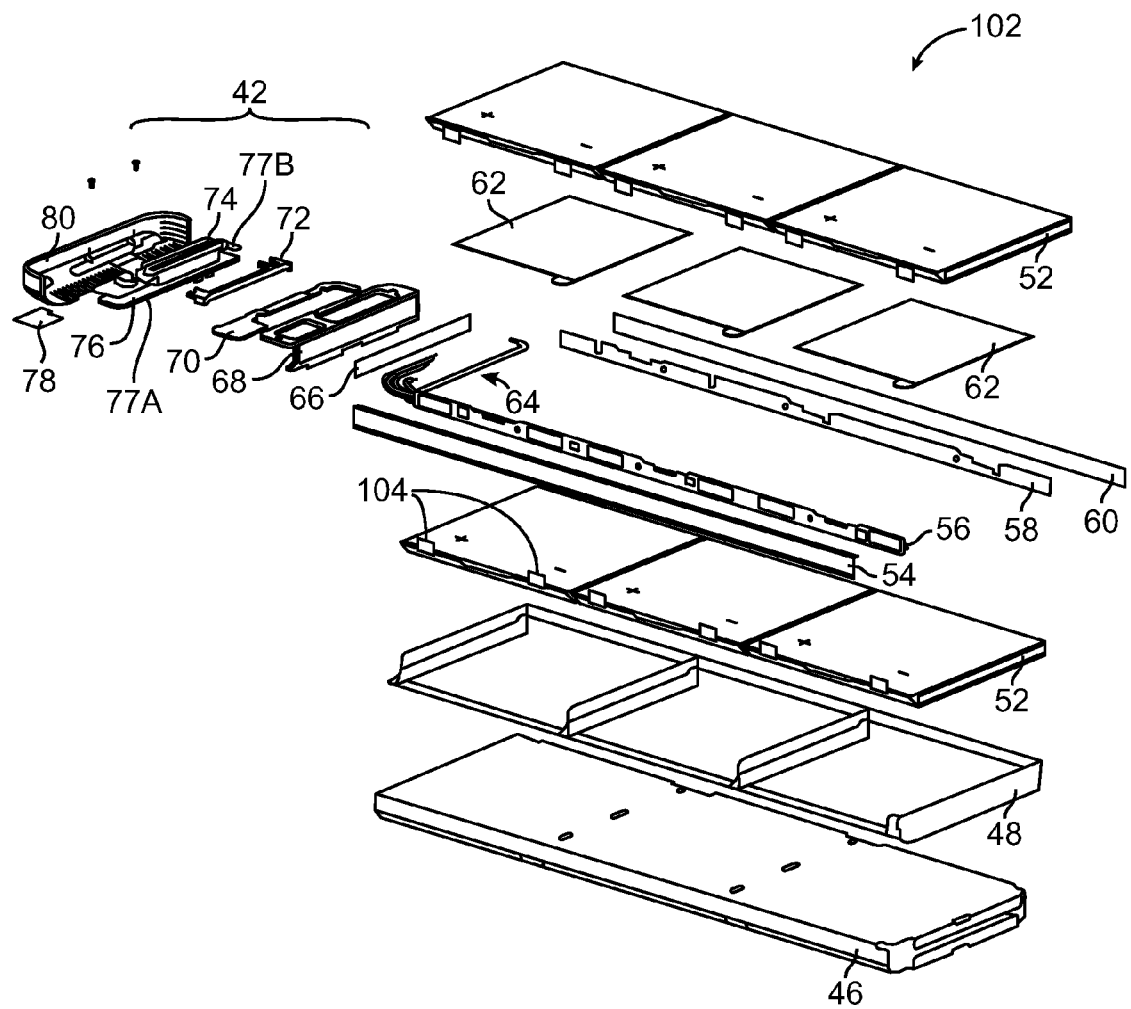
FIG. 4 is an exploded perspective view of an illustrative battery without its sheet metal sleeve structure in accordance with an embodiment of the present invention.

An exploded view of battery 102 is shown in FIG. 4. As shown in FIG. 4, battery 102 may have lithium ion cells 52 or other suitable battery cells. Cells 52 may be held together in part by pads 62 (e.g., double-sided tape 62 may hold the upper set of battery cells to the lower set of battery cells). Cells 52 may have tabs 104 that can be spot welded to conductive portions of bus bar 56. Bus bar 56 may be formed from polyimide with embedded conductive structures such as copper structures. Openings in the polyimide of bus bar 56 may be made to selectively expose the copper structures. Tabs 104 may be spot welded to the copper structures that are exposed in this way. Wires 64 may be electrically connected to the copper structures. The ends of wires 64 may be connected to circuitry in end cap region 42.

End cap portion 42 may include end cap plastic structure 80 and battery management unit printed circuit board 76. Battery management circuitry (e.g., one or more battery management integrated circuits) may be mounted on printed circuit board 76. Printed circuit board 76 may be formed from a rigid flex substrate. The substrate may be folded back upon itself as shown in FIG. 4 to form a two-layer board. The battery management circuit may be formed on the two layers of the battery management circuit substrate (E.g., the rigid flex substrate).

Insulating structures may be provided in battery 102 to prevent shorts. Insulating structures may include insulating patch 78, insulating strip 54, insulating structure 70, and insulating sheet 46. Insulating sheet 46 may be wrapped around cells 52 to complete the assembly of battery 102 and to enhance the structural integrity of battery 102. Insulating structures may be formed from flame resistant fiber sheets or other suitable materials.

Battery management unit holder 72 may be used to support the two portions of printed circuit board 76. Battery connector 74 may be mounted to the upper surface of printed circuit board 76. Battery management unit wall structure 68 helps to complete the end cap structure 42 by providing interior and lower walls. Foam 66 may help provide shock resistance. A die cut insulation layer 58 may protect tabs 104 and bus bar 56 after spot welding. Die cut plastic insert 60 may help provide a smooth surface that allows interior portion 40 of battery 102 to slide into shell 32 during assembly.

Frame 48 may be formed from plastic. During assembly of battery 102, cells 52 may be mounted in frame 48. After assembly is complete and an electrically insulating fabric sheet 46 has been wrapped around frame 48 and cells 52, interior portion 40 may be inserted into sleeve 32.

Figure 5:
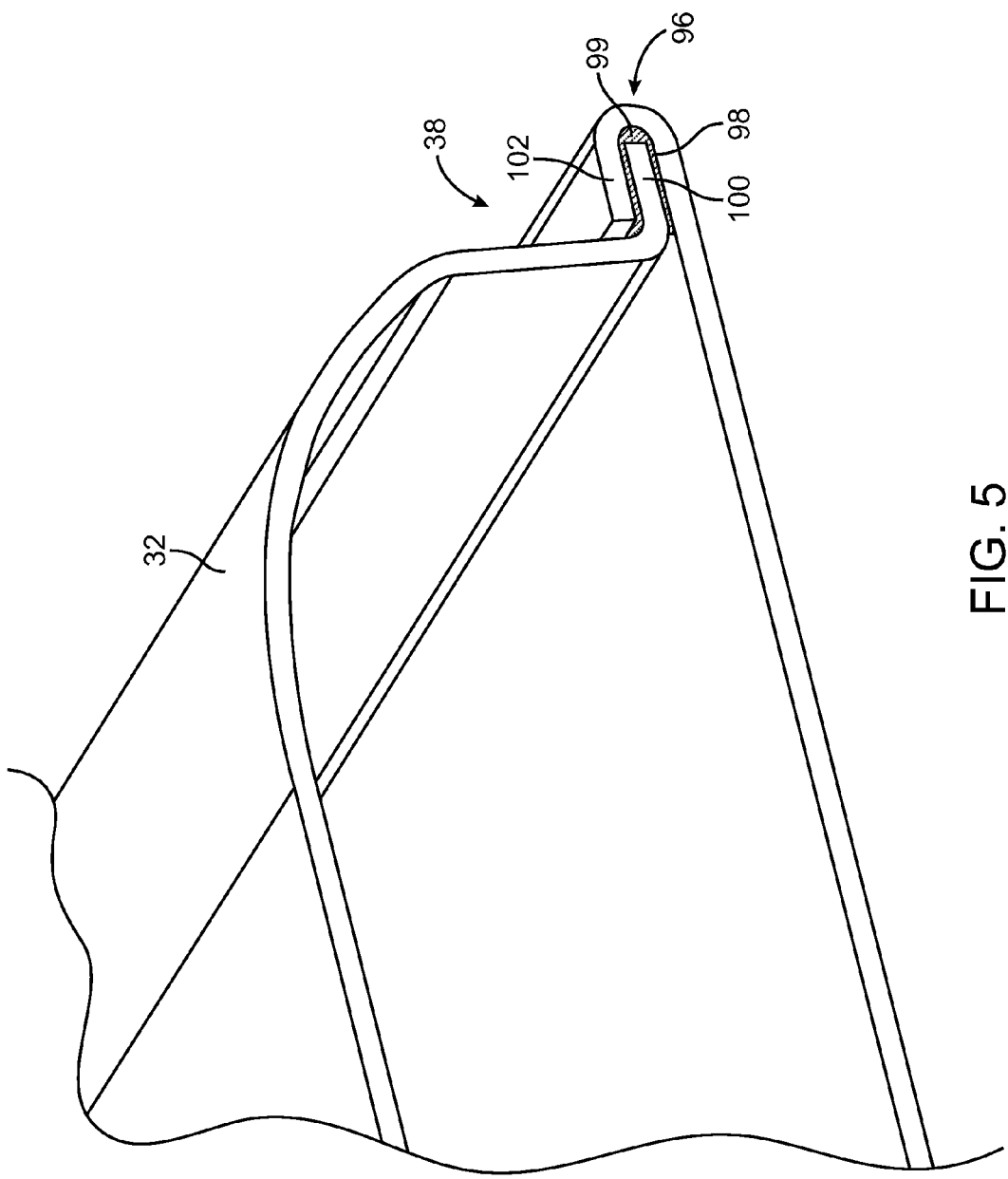
FIG. 5 is a perspective view of a portion of a battery sleeve hem structure that may be used in a battery enclosure in accordance with an embodiment of the present invention.

FIG. 5 shows how the hem 38 of sleeve 32 may be formed by folding sheet metal 102 onto itself (i.e., onto edge 100) at bend 96. Adhesive 99 may be inserted into gap 98 to help seal hem 38.

Figure 6:
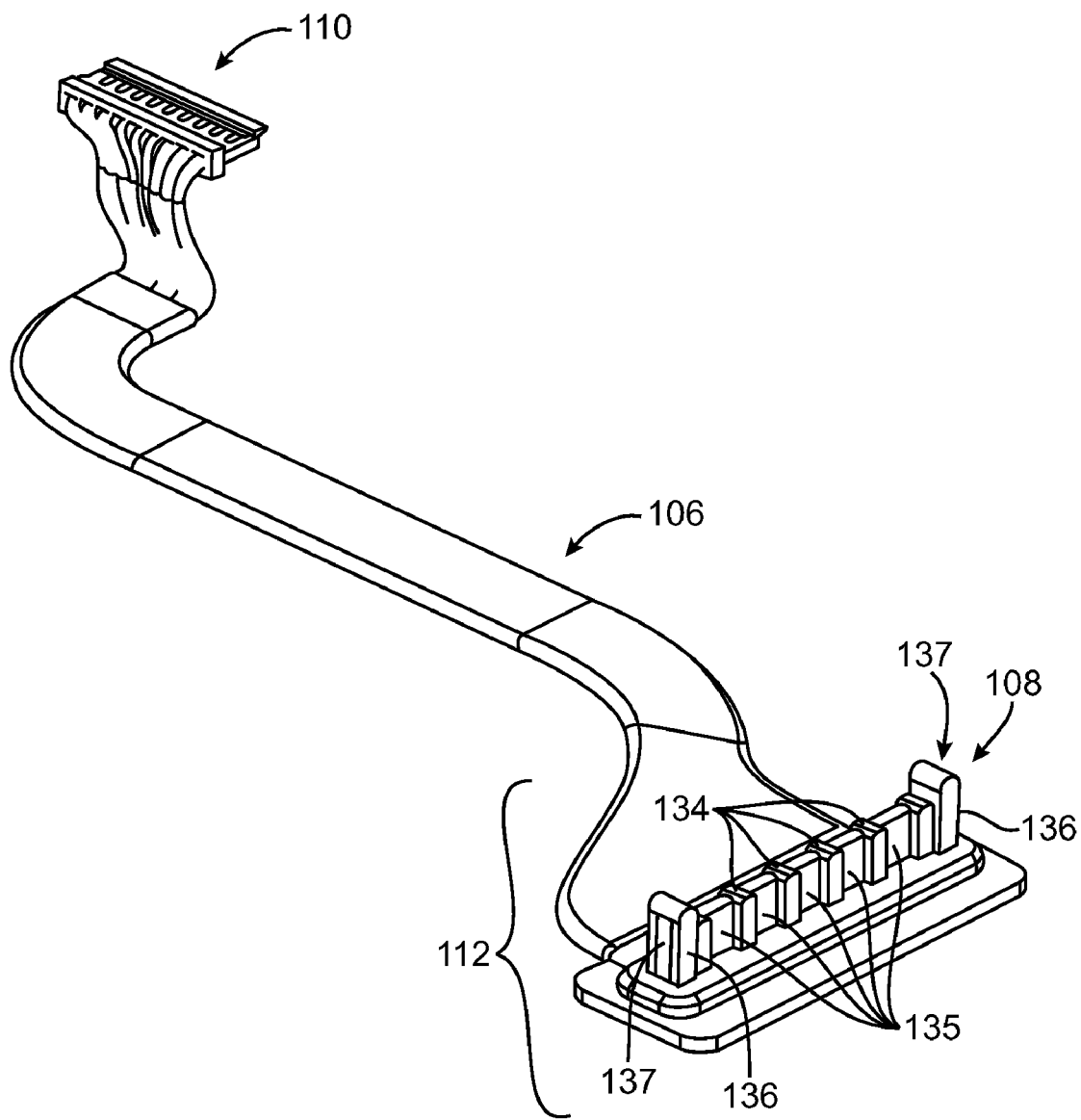
FIG. 6 is a perspective view of an illustrative battery connector that may be used in a portable computer in accordance with an embodiment of the present invention.

A computer power cable that may be connected to battery 102 when battery 102 is inserted in computer 10 is shown in FIG. 6. As shown in FIG. 6, cable 106 may have connectors at either end such as connector 108 and connector 110. Connector 110 may be connected to the main logic board in computer 10 or other suitable circuitry. The flat middle portion of cable 106 may be enclosed in a cover and may be placed along the interior surface of housing 12. Connector 108 may be a male battery connector in region 112 of cable 106 that mates with connector 74 of FIG. 4.

Connector 108 may have conductive pins (contacts) 135 and pins 137 that mate with corresponding contacts in connector 74 of FIG. 4. Connector 108 may have support pins 134 and pins 136 that mate with corresponding recesses in connector 74 when the connectors are coupled together. Pins 134 and 136 may help to hold connectors 74 and 108 in proper alignment when connectors 74 and 108 are coupled together.

The position in which battery 102 is inserted into computer 10 may vary between insertion events. To accommodate this natural variation in the position of battery connector 74, at least a portion of cable 106 may be floating (i.e., not rigidly attached to housing 12). This allows the end of cable 106 and connector 108 to move slightly as needed when battery 102 is connected to connector 108 by a user.

Figure 7:
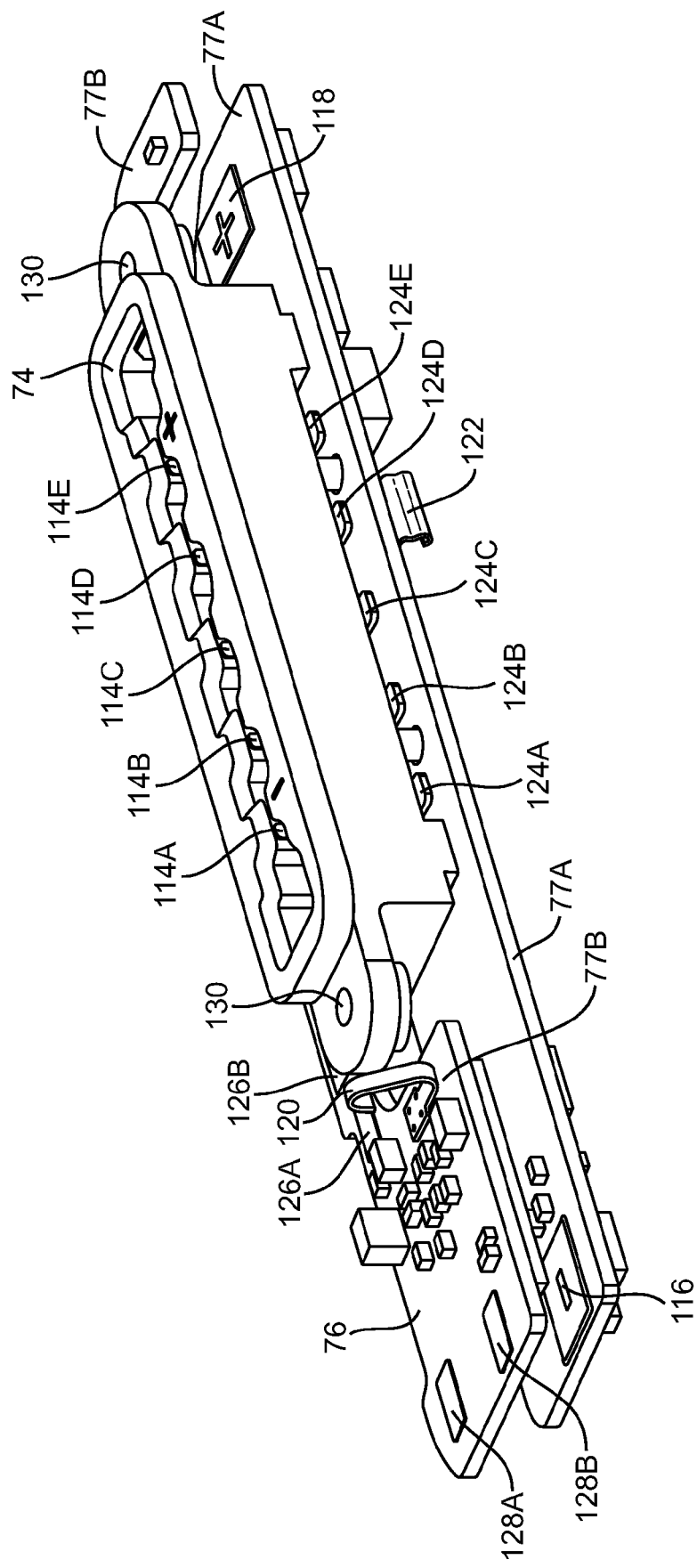
FIGS. 7 and 8 are perspective views of an illustrative battery management unit and an illustrative battery connector that may be used in a battery in accordance with an embodiment of the present invention.

FIG. 7 shows an enlarged view of the printed circuit board 76 and battery connector 74 shown in FIG. 4. Circuit board 76 may have circuitry that controls the operation of battery 102. Circuit board 76 may be electrically coupled to cells 52. Circuit board 76 may also be connected to circuitry in computer 10 through cable 106.

Printed circuit board 76 may include any suitable components. For example, circuit board 76 may include voltage regulator circuitry, battery monitoring circuitry that protects cells 52 during charging and discharging operations, and other suitable components.

Contacts 116 and 118 may be connected to battery cells 52 using wires 64.

Connector 74 may have connector pins 114A, 114B, 114C, 114D, and 114E that connect to corresponding conductive paths in cable 106 when connector 108 mates with connector 74 (e.g., when battery 102 is installed in computer 10). With one suitable arrangement, pin 114A may be a ground power pin and pin 114E may be a positive power pin.

If desired, one or more pins such as pins 114B, 114C, 114D, and 114E may be carry data signals between connector 74 and computer 10. For example, pin 114B may connect to a data signal path in cable 106 through a corresponding data signal portion of connector 108.

Pins such as pins 114B, 114C, 114D, and 114E may also be redundant power signal lines or data signal lines. As an example, pin 114C may be a redundant ground power pin and pin 114D may be a redundant positive power pin. If desired, one or more of pins 114A-E may be used to convey thermistor signals, clock signals, data signals, switching signals, intermediate voltage signals, and other suitable signals.

One or more of the pins 114A-E may also be used to convey intermediate power supply signals between computer 10 and battery 102. For example, pin 114A may be a ground power pin, pin 114C may be a first intermediate voltage pin, pin 114D may be a second intermediate voltage pin, and pin 114E may be a positive voltage pin. With one suitable arrangement, the first intermediate voltage corresponds to the voltage of a single cell 52, the second intermediate voltage corresponds to the voltage of two cells 52, and the positive voltage corresponds to the voltages of three cells 52. Each of these voltages may be regulated by circuit board 76 and may be provided by multiple cells connected together in series and in parallel through circuit board 76, as an example.

Ground springs 120 and 122 may electrically connect circuit board 76 to conductive sleeve 32. Springs 120 and 122 may be metal spring contacts that engage with a conductive surface of sleeve 32. With this type of arrangement, circuit board 76 may be grounded to sleeve 32 by springs 120 and 122.

Pins 124A-E may convey power and data signals between connector 74 and circuit board 76. With one suitable arrangement, battery contacts 124A-E are connected to electrical traces on circuit board 76.

Pads 128A and 128B may be intermediate voltage pads that are connected to wires 62. Pads 128A and 128B may also be connected to pins 114C and 114D, respectively. Circuit board 76 may receive intermediate voltages through pads 128A and 128B and may convey these voltages to computer 10 through connectors 74, 108 and 110 and cable 106.

Holes 130 in connector 74 may receive screws 35 (shown in FIG. 2). Screws 35 may hold connector 74 firmly against opening 36 of sleeve 32 so that cable connector 108 can be connected to connector 74 without putting pressure on or warping circuit board 76.

Figure 8:
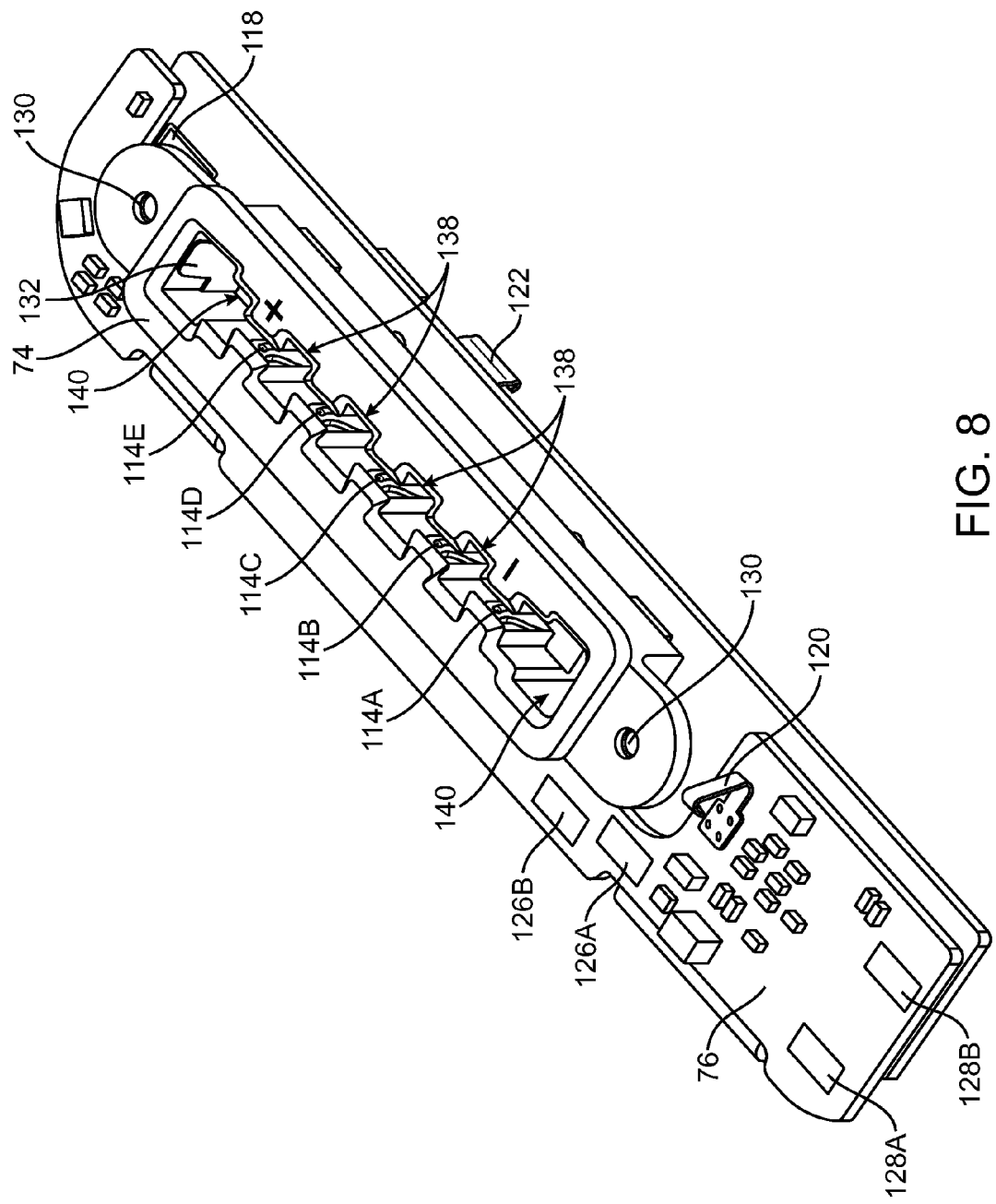

Battery 102 may include temperature sensors. As shown in FIG. 8, circuit board 76 may include one or more pads such as pads 126A and 126B. Pads 126A and 126B may be connected through wires 64 to temperature sensors that are distributed amongst cells 52 to measure the temperature of cells 52. The temperature sensors may be thermistors and pads 126A and 126B may be thermistor pads. Circuit board 76 may be able to obtain the temperature of cells 52 by measuring the resistance of the thermistors through pads 126A and 126B.

As shown in FIG. 8, connector 74 may include one or more side conductive contacts such as contact 132. Contact 132 may be a grounding contact that connects a ground trace in cable 106 to a ground trace in circuit board 76. Contact 132 may be used to convey any suitable signals such as a ground voltage, data signals, or a power supply voltage between circuit board 76 and cable 106.

FIG. 8 shows how connector 74 may have two enlarged regions 140 at each end of the connector and four enlarged regions 138 between contacts 114A-E. The enlarged regions may be enlarged relative to the portions of connector 74 corresponding to pins 114A-E. The enlarged regions at each end of connector 74 may be somewhat larger than the enlarged regions between the pins 114A-E. With one suitable arrangement, connector 108 may have enlarged structures at each end of the connector 108 that fit within the enlarged regions at each end of connector 74 when the connectors 74 and 108 are connected together. Connector 108 may also have somewhat smaller enlarged structures that fit within the enlarged regions of connector 74 between the pins 114A-E. The enlarged regions of connector 74 between pins 114A-E may also be referred to as connector receptacles. Conductive portions of connector 108 between all of the enlarged regions of connector 108 may couple with pins 114A-E. As an example, pins 114A-E may be receptacles that receive the conductive portions of connector 108 and that bear against the conductive portions of connector 108 when the connectors 74 and 108 are coupled together.

As shown in FIG. 8, Connector 74 may have four recesses 138 between conductive pins 114A-E as well as two recesses 140 that are relatively larger than the recesses 138 and that are located on either side of connector 74 (e.g., adjacent to pins 114A and 114E). When connector 108 of FIG. 6 is coupled to connector 74, support pins 134 and 136 of connector 108 may slide into recesses 138 and 140, respectively. Conductive pins 135 and 137 of connector 108 may the electrically couple to contacts 114A-E and 132 of connector 74.

Figure 9:
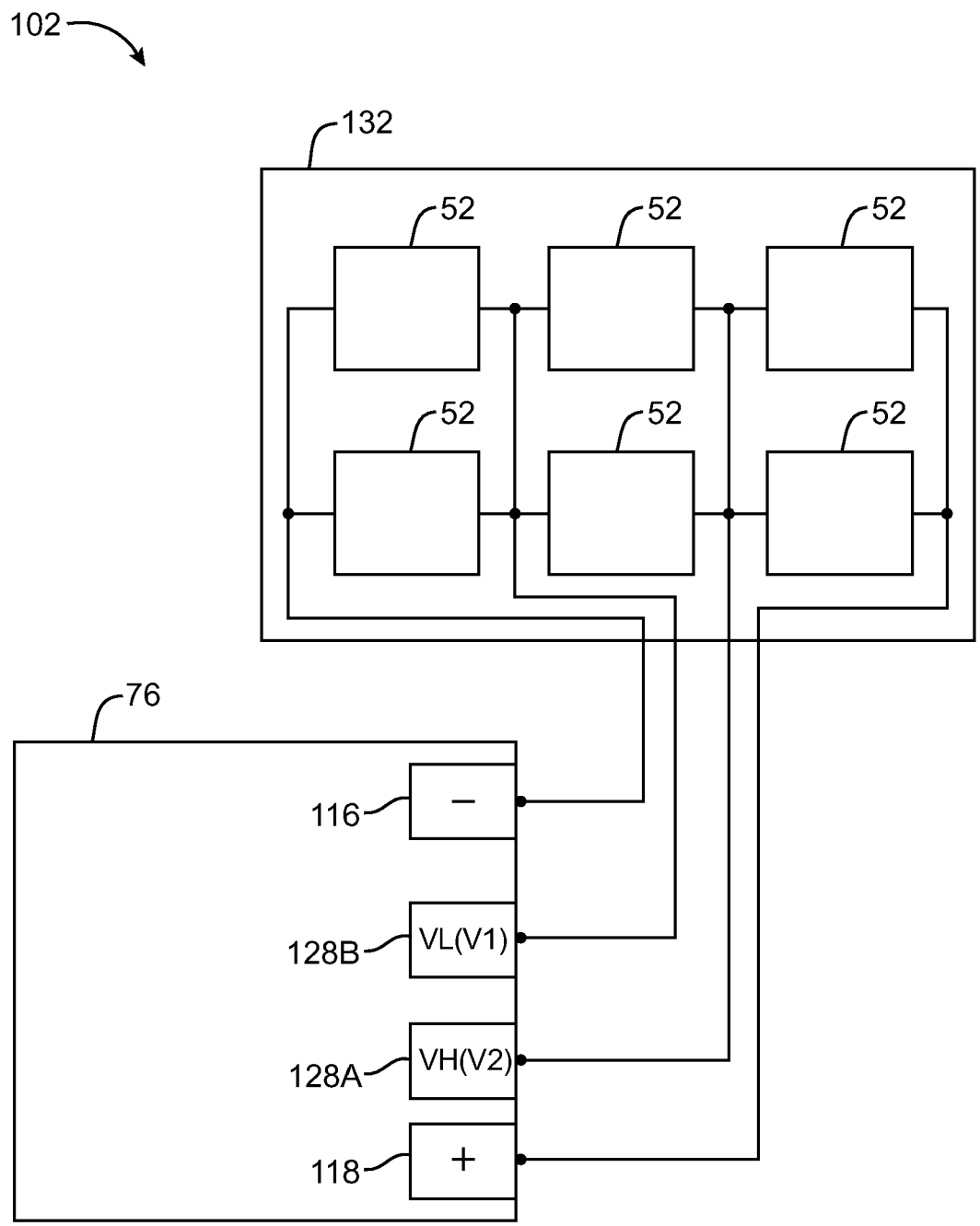
FIG. 9 is a schematic diagram of an illustrative battery that may be used in a portable computer in accordance with an embodiment of the present invention.

FIG. 9 shows a schematic diagram of battery 102. As shown in FIG. 9, cells 52 of battery 102 may form a pack 132. Cells 52 may be connected together in any suitable configuration. For example, cells 52 may be connected together through a combination of series and parallel electrical connections.

As shown in FIG. 9, a first set of three cells 52 may be connected together in series and a second set of three cells 52 may be connected together in series. The first and second sets of cells 52 may be connected together in parallel. With this type of arrangement, battery 102 may generate multiple different voltages that can be conveyed to computer 10 through circuit board 76. Each cell 52 may generate a particular voltage across its terminals 104 (e.g., each cell 52 may generate a voltage such as 1.5 volts, 3.7 volts, or any other suitable voltage). If desired, terminal 116 may be at a zero voltage or ground potential, terminal 128B may be a single cell voltage above ground (e.g., 3.7 volts), terminal 128A may be at the voltage of two cells connected in series (e.g., 7.4 volts), and terminal 118 may be at the voltage of three cells connected in series (e.g., 11.1 volts). Terminal 116 may be connected to contact 114A and terminal 118 may be connected to contact 114E (as an example).

Figure 10:
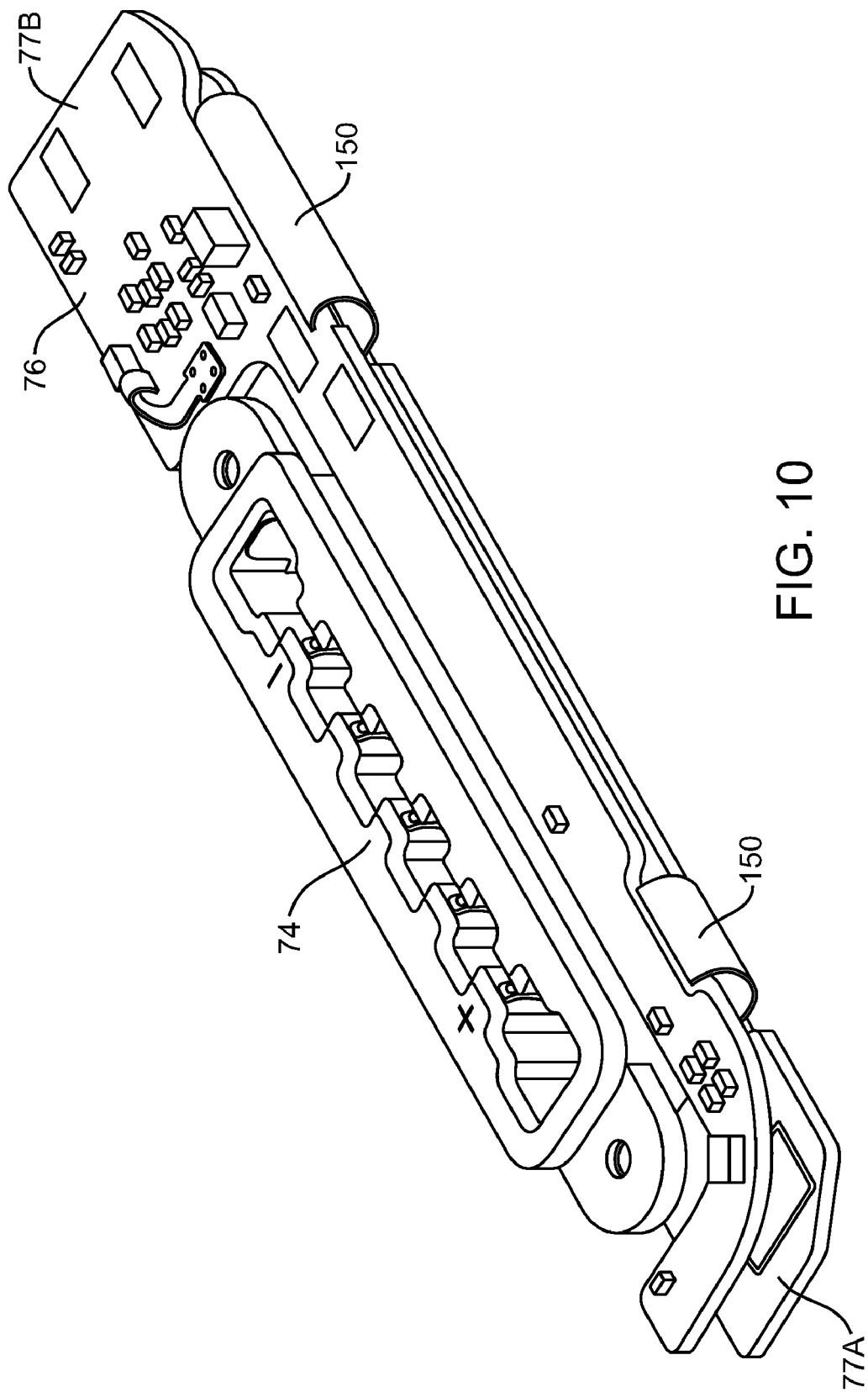
FIG. 10 is a perspective view of an illustrative battery management unit and battery connector that may be formed from a folded rigid flex substrate in accordance with an embodiment of the present invention.

As shown in FIGS. 4, 7, and 10, printed circuit board 76 may be formed from a rigid flex substrate that is folded back upon itself to form a two-layer board. For example, as shown in FIG. 10, circuit board 76 is folded back upon itself to form a two-layer board having a first layer 77A and a second layer 77B. Circuit board 76 may be folded back upon itself along folds 150 (e.g., a curved portion of the rigid flex substrate of board 76). If desired, insulating structures such as patch 78 and structure 70 of FIG. 4 may be located between layers 77A and 77B (e.g., to prevent shorts between the two layers of circuit board 76).

Figure 11A:
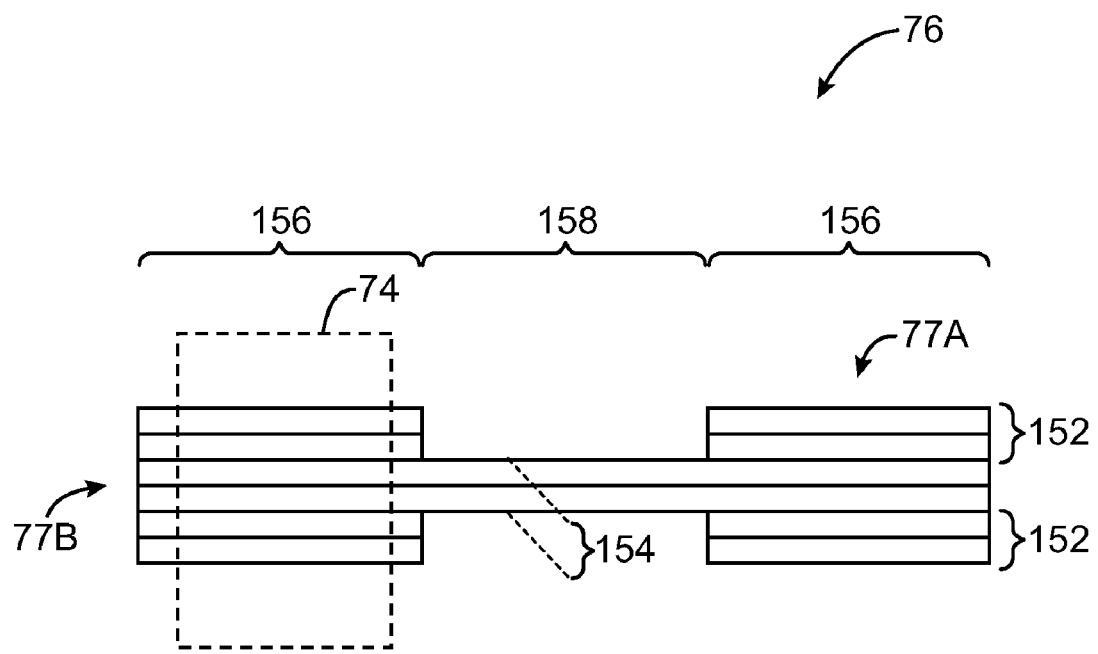
FIGS. 11A and 11B are cross-sectional side views of a rigid flex circuit board structure of the type that may be folded over on itself and may be used as a battery management unit printed circuit board structure mounted within a battery in accordance with an embodiment.
Figure 11B:
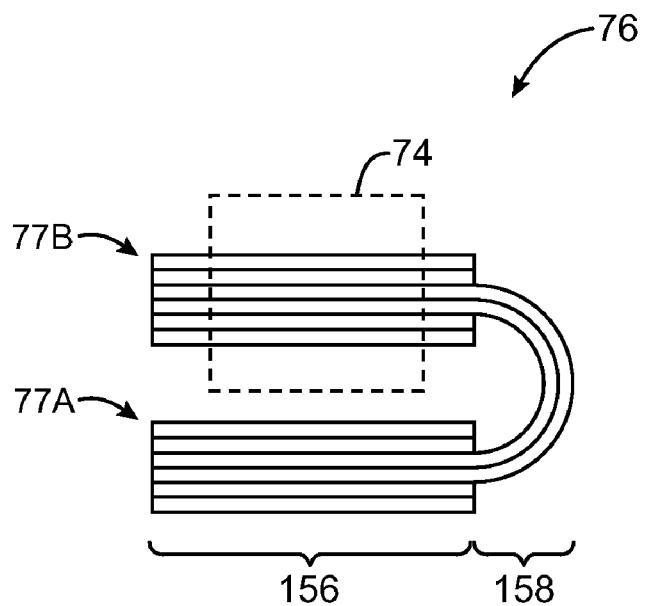

Battery management unit printed circuit board 76 may be formed from a rigid flex structure that is folded back upon itself to form a two-layer board. An arrangement of this type is shown in FIGS. 11A and 11B. As shown in the cross-sectional views of FIGS. 11A and 11B, circuit board 76 may include rigid flex structures such as rigid printed circuit board layers 152. Rigid printed circuit board layers 152 may be formed, for example, from fiberglass-filled epoxy or other suitable rigid dielectrics. Rigid flex circuit board 76 also contains flex circuit layers such as flex circuit layers 154. Flex circuit materials that may be used for flex circuit portion 154 include polyimide and other flexible dielectrics. Conductive traces (e.g., of copper, gold, or other suitable conductors) may be patterned within layers 152 and 154 to form desired interconnection patterns, electrical buses, etc.

As shown in FIG. 11A, at least some flex circuit portions in rigid flex circuit board 76 extend between the two rigid circuit board portions (e.g., layers 77A and 77B of circuit board 76), so that some of rigid flex circuit board 76 is rigid (e.g., portions 156) and some of rigid flex circuit board 76 is flex-ible (e.g., portion 158). As shown in FIG. 11B, rigid flex circuit board 76 may be folded back upon itself to form a two-layer circuit board.

The use of battery management unit circuit board arrangements such as the rigid flex arrangement of FIGS. 11A and 11B for battery management components in battery 102 may help to reduce the volume that the battery management components occupy which allows a smaller endcap 42 to be used and increased the volume of battery 102 that can be devoted to cells 52 (e.g., which can improve the energy density of battery 102 relative to conventional batteries).

In addition, the rigid flex arrangement may allow connector 74 to move slightly within battery 102. This may help to accommodate natural variation in the position of battery connector 74 when battery 102 is inserted into computer 10. For example, the rigid flex arrangement of FIGS. 11A and 11B can allow connector 74 to move slightly as needed when connector 74 is connected to connector 108 by a user.

The foregoing is merely illustrative of the principles of this invention and various modifications can be made by those skilled in the art without departing from the scope and spirit of the invention.

What is claimed is:

1. A laptop computer battery comprising:
   a plurality of battery cells;
   a battery connector;
   wires that connect the battery cells to the battery connector; and
   a sheet of metal wrapped around the plurality of battery cells and the wires to form a sleeve, wherein the sheet of metal has a bent portion forming a hem along an edge of the battery.

2. The laptop computer battery defined in claim 1 wherein the hem includes adhesive.

3. The laptop computer battery defined in claim 1 further comprising a conductive bus that electrically connects at least some of the battery cells together and that is disposed along a side of the battery cells, wherein the sleeve comprises portions defining an opening through which the battery connector is accessed.

4. A laptop computer battery comprising:
   a plurality of battery cells;
   a battery connector;
   wires that connect the battery cells to the battery connector; and
   a sheet of metal wrapped around the plurality of battery cells and the wires to form a sleeve, wherein the battery cells comprise:
      a first set of three planar battery cells; and
      a second set of three planar battery cells, wherein the battery cells in the first set are positioned adjacent to each other along a horizontal direction, wherein the battery cells in the second set are positioned adjacent to each other along the horizontal direction, wherein each of the battery cells has a substantially square surface, and wherein the surfaces of the battery cells in the first set are aligned with the surfaces of the battery cells in the second set.

5. The laptop computer battery defined in claim 4 further comprising double sided tape between the first and second sets of battery cells.

6. The laptop computer battery defined in claim 4 further comprising a frame and an electrically insulating sheet, wherein the battery cells are mounted within the frame, wherein the electrically insulating sheet is wrapped around the frame and the battery cells, and wherein the sleeve encloses the electrically insulating sheet.

7. The laptop computer battery defined in claim 4 further comprising a battery management unit.

8. The laptop computer battery defined in claim 7 wherein the battery management unit comprises battery management circuitry on a battery management substrate and wherein the battery management substrate is folded back upon itself to form two substantially parallel layers.

9. The laptop computer battery defined in claim 8 further comprising a thermistor that is connected to the battery management circuitry and that is thermally connected to at least one of the battery cells, wherein the battery management circuitry is configured to measure the resistance of the thermistor to determine the temperature of the battery cell.

10. A battery comprising:
a plurality of battery cells;
a battery enclosure that encloses the battery cells;
a battery management circuit substrate, wherein the battery management circuit substrate is folded back upon itself to form two substantially parallel substrate layers; and
battery management circuitry on the two substantially parallel substrate layers, wherein the battery enclosure is formed from a layer of sheet metal that has a hem.

11. The battery defined in claim 10 wherein the battery management circuit substrate comprises a rigid flex substrate that is folded back upon itself to form the two substantially parallel substrate layers.

12. The battery defined in claim 11 further comprising a ground spring and a battery connector, wherein the ground spring is mounted on a first one of the two substantially parallel substrate layers of the rigid flex substrate and wherein the battery connector is mounted on a second one of the two substantially parallel substrate layers of the rigid flex substrate.

13. The battery defined in claim 10 further comprising an insulating structure between the two substantially parallel substrate layers.

14. The battery defined in claim 10 further comprising an insulating sheet wrapped around the battery cells.

15. The battery defined in claim 10 further comprising a flame resistant fiber sheet wrapped around the battery cells.

16. The battery defined in claim 10 wherein the layer of sheet metal is folded back upon itself along a first edge and wherein the hem is disposed along a second edge that is opposite the first edge.

17. The battery defined in claim 10 wherein the layer of sheet metal is folded back upon itself along a first edge, wherein the hem is disposed along a second edge that is opposite the first edge, and wherein the hem comprises a folded portion of the sheet metal and an adhesive.

* * * * *